(12) United States Patent
Prociw et al.

(10) Patent No.: US 7,530,231 B2
(45) Date of Patent: May 12, 2009

(54) FUEL CONVEYING MEMBER WITH HEAT PIPE

(75) Inventors: Lev Alexander Prociw, Elmira (CA); Harris Shafique, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 669 days.

(21) Appl. No.: 11/095,665

(22) Filed: Apr. 1, 2005

(65) Prior Publication Data

US 2006/0218926 A1  Oct. 5, 2006

(51) Int. Cl.
F02C 1/00 (2006.01)
F02G 3/00 (2006.01)

(52) U.S. Cl. ..................... 60/740; 165/104.26
(58) Field of Classification Search ............. 60/739, 60/740; 165/104.26, 104.21, 104.33
See application file for complete search history.

(56) References Cited

U.S. PATENT DOCUMENTS

| | | | |
|---|---|---|---|
| 2,151,540 A | 3/1939 | Varga | |
| 2,946,185 A | 7/1960 | Bayer | |
| 2,951,341 A * | 9/1960 | Henning, Jr. et al. | 60/739 |
| 3,213,523 A | 10/1965 | Boehler | |
| 3,472,025 A | 10/1969 | Simmons et al. | |
| 3,719,042 A * | 3/1973 | Chamberlain | 60/739 |
| 3,746,079 A * | 7/1973 | Arenson | 165/96 |
| 4,100,733 A | 7/1978 | Striebel et al. | |
| 4,322,945 A | 4/1982 | Peterson et al. | |
| 5,036,657 A | 8/1991 | Seto et al. | |
| 5,253,471 A | 10/1993 | Richardson | |
| 5,271,219 A | 12/1993 | Richardson | |
| 5,314,011 A * | 5/1994 | Leidinger et al. | 165/104.26 |
| 5,396,759 A | 3/1995 | Richardson | |
| 5,400,968 A | 3/1995 | Sood | |
| 5,419,115 A | 5/1995 | Butler et al. | |
| 5,423,178 A | 6/1995 | Mains | |
| 5,570,580 A | 11/1996 | Mains | |
| 5,598,696 A | 2/1997 | Stotts | |
| 5,701,751 A * | 12/1997 | Flores | 62/169 |
| 5,771,696 A | 6/1998 | Hansel et al. | |
| 5,848,525 A | 12/1998 | Spencer | |
| 5,956,955 A | 9/1999 | Schmid | |
| 5,983,642 A | 11/1999 | Parker et al. | |
| 5,996,335 A | 12/1999 | Ebel | |
| 6,109,038 A | 8/2000 | Sharifi et al. | |
| 6,141,968 A | 11/2000 | Gates et al. | |
| 6,149,075 A * | 11/2000 | Moertle et al. | 239/132.3 |
| 6,240,732 B1 | 6/2001 | Allan | |
| 6,256,995 B1 | 7/2001 | Sampath et al. | |
| 6,463,739 B1 * | 10/2002 | Mueller et al. | 60/765 |
| 6,755,024 B1 * | 6/2004 | Mao et al. | 60/776 |

(Continued)

Primary Examiner—William H Rodriguez
(74) Attorney, Agent, or Firm—Ogilvy Renault LLP (57) ABSTRACT

A fuel conveying member in a fuel system of a gas turbine engine includes a heat pipe disposed in heat transfer communication with a fuel flow passage of the fuel conveying member, such that heat is transferred by the heat pipe from a high temperature region to a lower temperature region of the fuel flow passage. The heat pipe has a constant mass or working fluid enclosed within a sealed chamber in heat transfer communication with fuel in said fuel flow passage, said working fluid being self-circulating in a fluid flow having a liquid portion and a vapor portion, said working fluid passively boiling, flowing and condensing to transfer heat from said high temperature region to said lower temperature region.

9 Claims, 6 Drawing Sheets

U.S. PATENT DOCUMENTS

| | | |
|---|---|---|
| 6,761,035 B1 | 7/2004 | Mueller |
| 7,028,484 B2 * | 4/2006 | Prociw et al. ............... 60/772 |
| 2005/0188699 A1 * | 9/2005 | Shafique et al. ............. 60/739 |
| 2006/0156733 A1 * | 7/2006 | Prociw et al. ............... 60/776 |
| 2006/0218925 A1 * | 10/2006 | Prociw et al. ............... 60/739 |
| 2006/0260317 A1 * | 11/2006 | Prociw et al. ............... 60/739 |
| 2007/0044477 A1 * | 3/2007 | Held et al. .................. 60/776 |
| 2007/0204621 A1 * | 9/2007 | Fish ............................. 60/739 |
| 2008/0016870 A1 * | 1/2008 | Morenko ..................... 60/739 |
| 2008/0072599 A1 * | 3/2008 | Morenko et al. ............. 60/734 |
| 2008/0083223 A1 * | 4/2008 | Prociw et al. ............... 60/739 |
| 2008/0083225 A1 * | 4/2008 | Fish et al. ................... 60/772 |

* cited by examiner

FUEL CONVEYING MEMBER WITH HEAT PIPE

TECHNICAL FIELD

The invention relates generally to a fuel conveying member in a gas turbine engine or similar equipment.

BACKGROUND OF THE ART

Fuel conveying passages, conduits, manifolds and the like employed internally within gas turbine engines and other high-temperature equipment are exposed to high temperatures, particularly those located adjacent the combustor. Portions of fuel passages which are disposed in the upper regions of the engine casing are particularly prone to overheating, as a result of several factors such as hot air accumulation following engine shutdown for example. If temperatures get too high, fuel tends to decompose within these fuel conveying members causing undesirable accumulations of carbon or coke within the passages, which can lead to poor combustor fuel distribution which is detrimental to the life of the engine. Fuel flow passages must thus be periodically cleaned to dislodge these accumulations.

Accordingly, there is a need for a gas turbine engine with improved fuel conveying members.

SUMMARY OF THE INVENTION

It is therefore an object of this invention to provide an improved gas turbine engine fuel conveying member.

In one aspect, the present invention provides a gas turbine engine internal fuel manifold comprising at least one fuel flow passage and at least one heat pipe mounted to the fuel manifold, the heat pipe being adapted to transfer heat from a high temperature region of said fuel flow passage to a lower temperature region of the engine.

In another aspect, the present invention provides a fuel conveying member in a gas turbine engine, the fuel conveying member comprising at least one fuel flow passage having a high temperature region and a lower temperature region thereof, a heat pipe being disposed in heat transfer communication with said fuel flow passage and extending between said high and low temperature regions.

In yet another aspect, the present invention provides a gas turbine engine including a fuel system providing fuel to the combustor, the fuel system including a fuel manifold having mounted thereto self-contained heat transfer means disposed therewithin for passively transferring heat from a high temperature region of said fuel manifold to a lower temperature region thereof.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
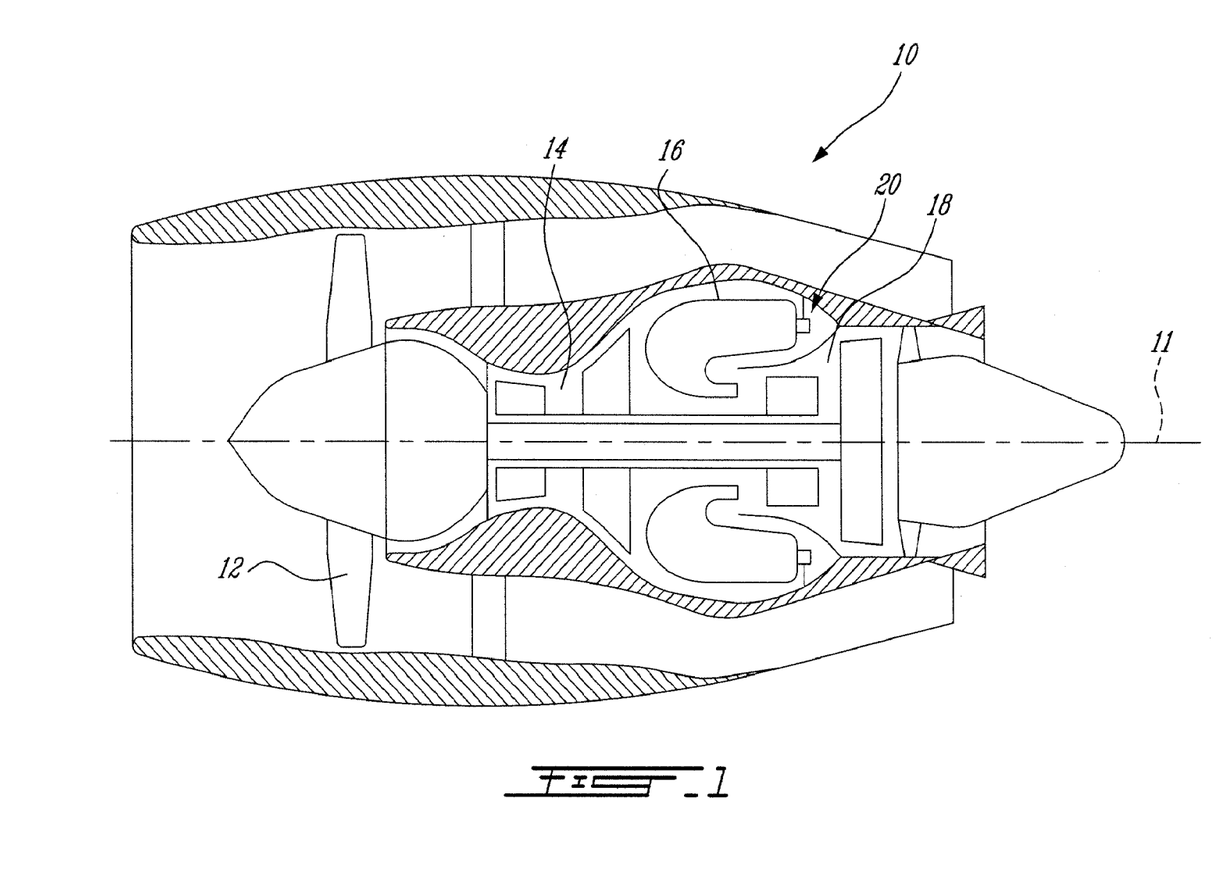
FIG. 1 is a schematic partial cross-section of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Fuel is injected into the combustor 16 of the gas turbine engine 10 by a fuel system 20 which includes a fuel source (not shown) and at least one fuel conveying member, such as internal manifold ring 22, which is operable to inject fuel into the combustor 16 for mixing with the compressed air from the compressor 14 and ignition of the resultant mixture. The fan 12, compressor 14, combustor 16, and turbine 18 are preferably all concentric about a common central longitudinal axis 11 of the gas turbine engine 10.

Figure 2:
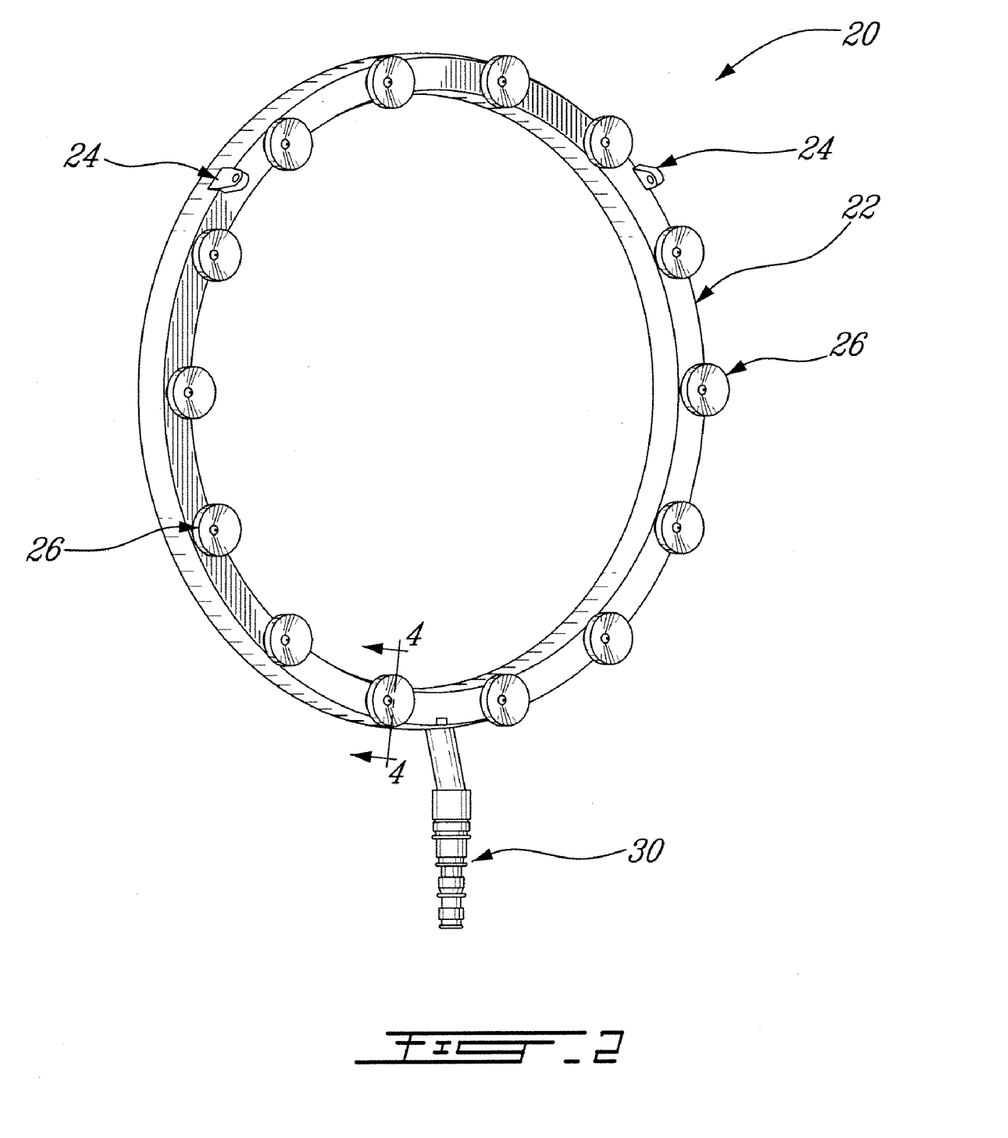
FIG. 2 is a perspective view of a fuel manifold in accordance with one aspect of the present invention, for use in a gas turbine engine such as that depicted in FIG. 1.

Referring to FIG. 2, as mentioned, the fuel injection system 20 includes at least one fuel conveying member through which fuel flows. In the exemplary embodiment, the fuel system includes an injection system having an annular internal fuel manifold ring 22 which is mounted adjacent to the combustor 16 in the gas turbine engine 10. The fuel manifold ring 22 is preferably mounted to the combustor 16 or to surrounding support structure (typically the engine case) via several integral attachment lugs 24 which receive pins (not shown) engaged to the support structure. This preferably provides a mounting mechanism which allows for thermal expansion of the fuel manifold ring 22 at high temperatures. A plurality of fuel injecting nozzle assemblies 26 are provided about the circumference of the fuel manifold ring 22. The fuel nozzle assemblies 26 atomize the fuel as it is injected into the combustor for ignition when mixed with the compressed air therein. Fuel enters the annular fuel manifold ring 22 via fuel inlet 30, and is distributed within the manifold ring 22 such that fuel flow is provided to each of the fuel nozzles assemblies 26.

Figure 3:
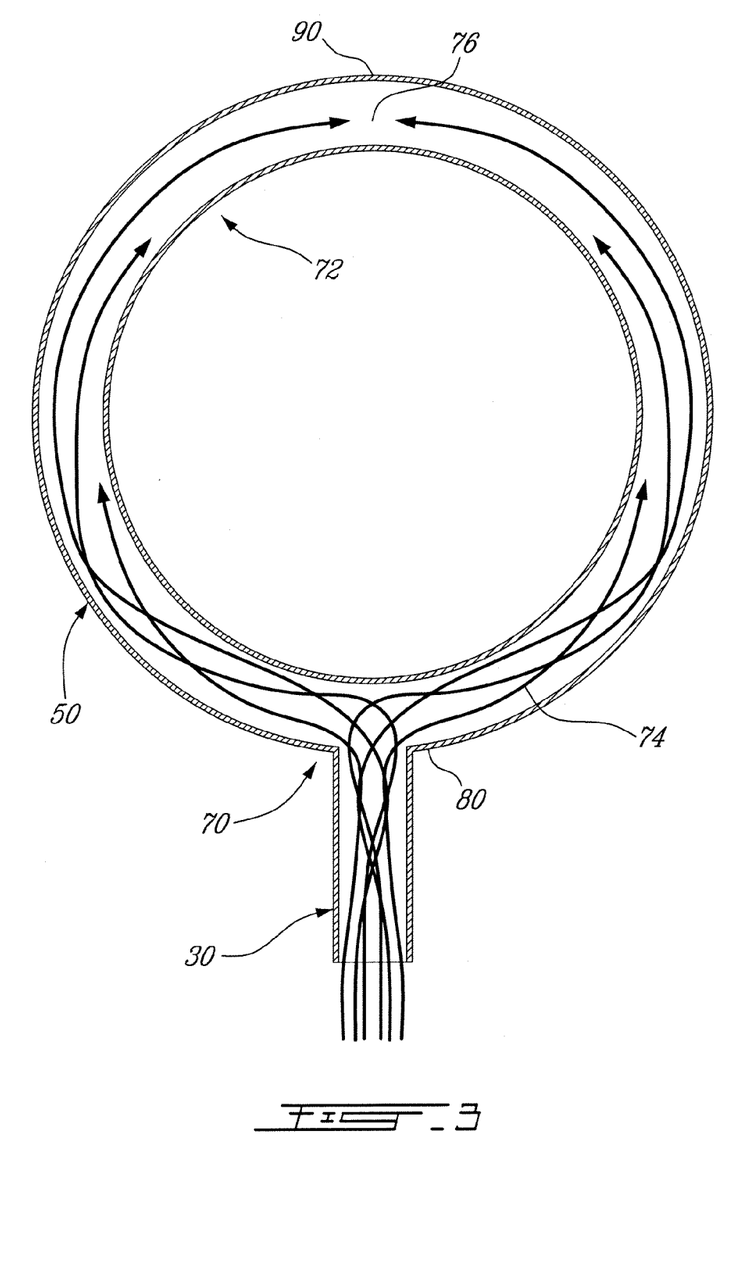
FIG. 3 is a schematic front elevation view of the fuel manifold of FIG. 2 (with heat shields removed), schematically showing fuel flow therethrough and the heat transfer device mounted thereto.

Referring to FIG. 3, the schematic fuel manifold ring 22 shows fuel flow depicted by flow lines 74 which enters the inlet 30 preferably at the bottom of the manifold and is circulated upwards around the manifold ring 22 towards an uppermost point 76 at the top of the manifold, substantially diametrically opposite to the inlet 30. As the fuel circulates upwards through the manifold ring 22, fuel is drawn out of the fuel flow passage of the manifold and into the fuel injectors (not shown in FIG. 3) about the circumference of the manifold for injection into the combustion chamber. Thus, the fuel flow through the manifold is greatest near the bottom portion 70 of the manifold and decreases towards the upper portion 72 of the manifold, by which point most fuel has been expelled. This is graphically represented by the fuel flow lines 74 which are more numerous in the bottom portion 34 of the manifold than at the upper portion 36 thereof. Thus, as a large quantity of relatively cold fuel enters the manifold 22 at the inlet 30, the lower portion 70 of the manifold adjacent inlet 30 tends to remain relatively cool due to the relatively large flow of fuel through this region which is typically sufficient to convectively cool the inner walls of the fuel flow passage within the manifold. However, as substantially less fuel reaches the upper portion 72 of manifold, the amount of convective cooling provided by the flow of fuel within the manifold in this upper region 72 is reduced, partly by reason of this reduced flow. This region therefore tends to become relatively hotter than the lower portion of the manifold. Consequently, for this and other reasons, this upper portion of the manifold ring is typically prone to overheating in the prior art.

Therefore, according to the present invention, the fuel manifold ring 22 includes a passive cooling means, such that the likelihood of overheating of any particularly region of the fuel manifold is minimized.

Both the fuel manifold ring 22 and the fuel injecting nozzle assemblies 26 act as fuel conveying members, and according to the present invention within at least one of these is disposed a heat transfer device 50 which passively transfers the heat from high temperature regions of the fuel conveying member to cooler regions thereof. As noted above, the upper portion 72 of the fuel manifold 22 is less cooled by convection due to the lower quantities of fuel flowing therethrough than in the lower portion 70 thereof. The heat transfer device 50 helps to alleviate this by providing means to cool the upper portion 72 by transferring heat from this region to the cooler lower portion 70, where the higher quantity of fuel flow is able to absorb more heat from the walls of the fuel flow passage 40.

Figure 4:
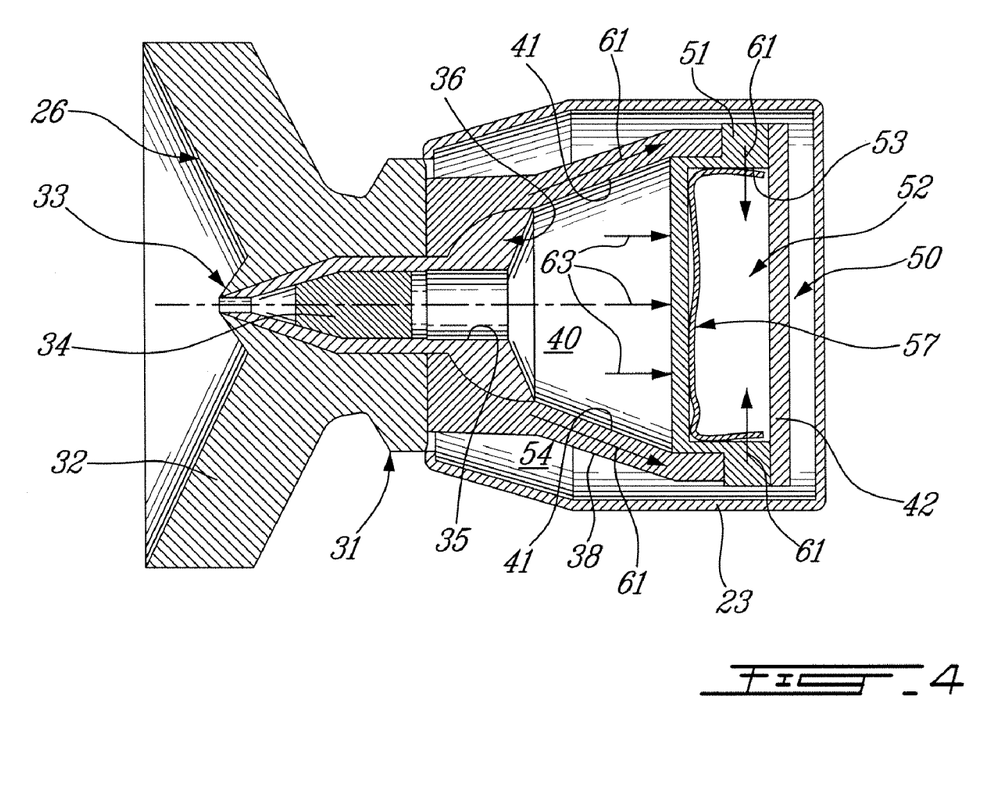
FIG. 4 is a schematic cross-sectional view of the fuel manifold of FIG. 2, taken through line 4-4 thereof.

Referring in more detail now to the embodiment of FIG. 4 in which the fuel conveying member includes a fuel manifold 22 and associated fuel injector assemblies 26, the interior construction of the fuel manifold ring 22 and a fuel nozzle assembly 26 of the fuel injection system 20 is depicted. Particularly, the fuel nozzle assembly 26 preferably projects axially (i.e. generally parallel relative to the central longitudinal axis 11 of the gas turbine engine 10—see FIG. 1) outwardly from fuel manifold ring 22, and includes a central body 31 from which air swirler vanes 32 project about a central spray tip opening 33 defined in the central body 31 and through which the fuel exits the fuel nozzle assembly 26. An inner fuel nozzle portion 36 defines a central fuel channel 35 therethrough, which extends between a fuel flow passage 40 and the spray tip opening 33. The inner fuel nozzle portion 36 is preferably engaged with the surrounding central body 31 of the nozzle assembly by a local braze attachment which provides a seal therebetween. A fuel swirler 34 is also preferably provided within the central fuel channel 35 of the inner fuel nozzle portion 36. Nozzle 26 may otherwise be made, if desired, in accordance with Applicant's U.S. Pat. No. 6,082, 113, incorporated herein by reference.

The central body 31 includes a rear body portion 38 which projects into the fuel manifold ring 22 and at least partially defines the fuel source passage 40 therewithin. The fuel flow passage 40 is defined within interior walls 41 thereof, and preferably defines an annular passage provided within the fuel manifold ring 22. A rear sealing plate 42 is fastened to or otherwise positioned adjacent the rear walls of the rear body portion 38 at the open end thereof, thereby sealingly enclosing the fuel flow passage 40 of the manifold. Preferably, the rear sealing plate 42 is brazed in place about the full circumference of the manifold ring. The exterior of the annular fuel manifold ring 22 comprises an outer heat shield 23 which covers the ring. This provides the fuel manifold ring 22 with some thermal protection from the high temperature environment of the combustion chamber. However, as noted above certain regions of the fuel manifold, particularly the upper portions thereof, nevertheless tend to experience particularly high temperatures due to lower convective cooling from fuel flow, and therefore are cooled using the heat transfer device 50. The heat transfer device 50 is preferably integrated with the fuel manifold ring 22 and immediately adjacent thereto, and in the depicted embodiment includes a body 51 defining a rear wall which acts to enclose the fuel flow passage 40 of the manifold ring 22.

According to the present invention, the heat transfer device 50 comprises a heat pipe. A heat pipe provides a compact, self-sustaining and self-contained cooling/heat transfer means which the inventors have found is particularly suited to fluid conveying members used in gas turbine engines which may require cooling, and is propitiously suited for internal fuel manifolds thereof.

Heat pipes are devices that employ the evaporation and condensation of a working fluid contained therewithin to effect the transfer of energy from the evaporator, where heat is absorbed, to the condenser, where the heat is released. Heat pipes are, generally speaking, containment vessels that are charged with a working substance which is continuously evaporated and condensed as heat is added to the evaporator and removed from the condenser. Heat pipes generally take advantage of the physical attributes of liquids, which can absorb large amounts of heat from a surface when they undergo boiling. The working fluid undergoes a large volume change when it transforms from liquid to vapour phase, and subsequently back from vapour to liquid. These volumetric changes can be used to drive the flow of vapour from hot to cold regions. The rate at which vapour is typically produced is directly proportional to the rate of heat flowing into the heat pipe. The ability of a heat pipe to transfer energy rests on the fact that non-condensable gaseous species within the chamber are removed from the heat pipe prior to operation. As such, a heat pipe is typically partially or completely evacuated prior to its use as a heat transfer device. By eliminating non-condensable gases from the chamber containing the working fluid, the vapour that is generated in the evaporator flows to the condenser down a pressure gradient in much the same way as a pump causes fluid to move through an enclosure. With the presence of non-condensable gases, the vaporized working substance can move by molecular diffusion down a concentration gradient. Given that a pressure driven flow can be orders of magnitude more effective in moving vaporized working substance, heat pipe systems are generally evacuated. However, if the heat pipe chamber develops a leak, the heat pipe will cease to function. The foregoing is intended as a general description of known heat pipe systems.

According to the present invention, the heat pipe provided as heat transfer device 50 takes advantage of the two-phase heat transfer available from the working fluid in a heat pipe, which working fluid is preferably water in this embodiment, however any other suitable working fluid may be used. Water is preferred as it has convenient boiling and condensation points, and has relatively high thermal conductivity relative to air and other conveniently available liquids. Water is also inexpensive and present no environmental hazards. As such, the particular characteristics of the heat pipe 50 can be designed to best match the cooling requirements of the fuel manifold 22 using water as the working medium. Further, as will be understood by the skilled reader, pressure within the sealed heat pipe can be modified to selectively regulate the boiling point of the working fluid. Selection of the appropriate liquid and adjustment of pressure in the pipe during manufacture controls the temperature at which the liquid will boil and avoids freezing concerns (see, for example, Silverstein C. Calvin, "*Design and Technology of Heat Pipes for Cooling and Heat Exchange*", Taylor and Francis, 1992, incorporated herein by reference).

Referring still to FIG. 4, the heat pipe provided as heat transfer device 50 includes a body 51, a working fluid 52 and a channel 53 defined within the heat pipe body 51 and within which the working fluid 52, preferably water, is enclosed. Channel 53 is sealed and is capable of supporting a pressure differential between working fluid and conditions outside the channel. In a preferred embodiment, the pressure inside channel 53 is set during manufacture to provide the working fluid (in this case water) with a boiling point of less than 100° C., and more preferably less than 80° C., and still more preferably less than 65° C. The skilled reader will appreciate both that a liquid's boiling point may be regulated by controlling pressure, and that the boiling point may be selected to provide the desired cooling function by the heat pipe to reduce or prevent coking in manifold 22 as desired. Selection of the appropriate liquid and adjustment of pressure in the pipe during manufacture thus controls the temperature at which the liquid will boil, and allows one to address any working liquid freezing concerns.

An embedded wick 57 is preferably disposed adjacent at least one inner wall surface of the heat pipe to aid the circulation of the liquid water to the hotter region of the heat pipe within which the liquid boils and evaporates. In this embodiment, wick 57 is disposed preferably adjacent and in contact with three inner walls of the channel 53, which helps put liquid in contact with the portions of the heat pipe having the highest heat (as represented by arrows 61 and 63, discussed below). The wick 57 helps circulate the liquid working fluid around the manifold by transferring the liquid by "wicking" water from the lower portions of the manifold to the hotter upper region 72 thereof which requires cooling, as is described further below. Wick member 57 preferably comprises a fine metallic mesh or screen, metal foam material, or other suitable wicking material, as will be understood by the skilled reader in light of this disclosure.

Figure 5:
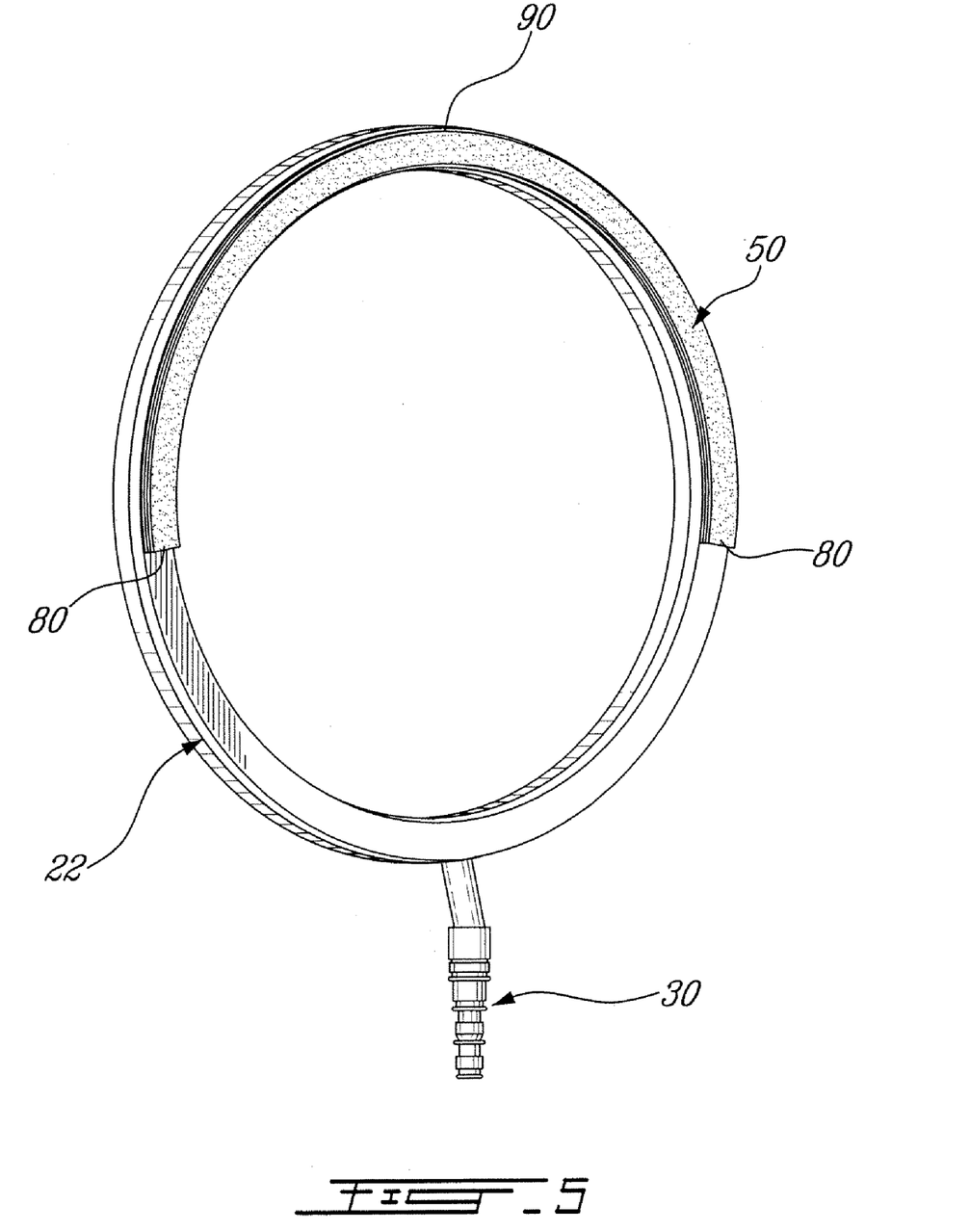
FIG. 5 is a rear view (shown without heat shields) of an alternate configuration for the invention.
Figure 6:
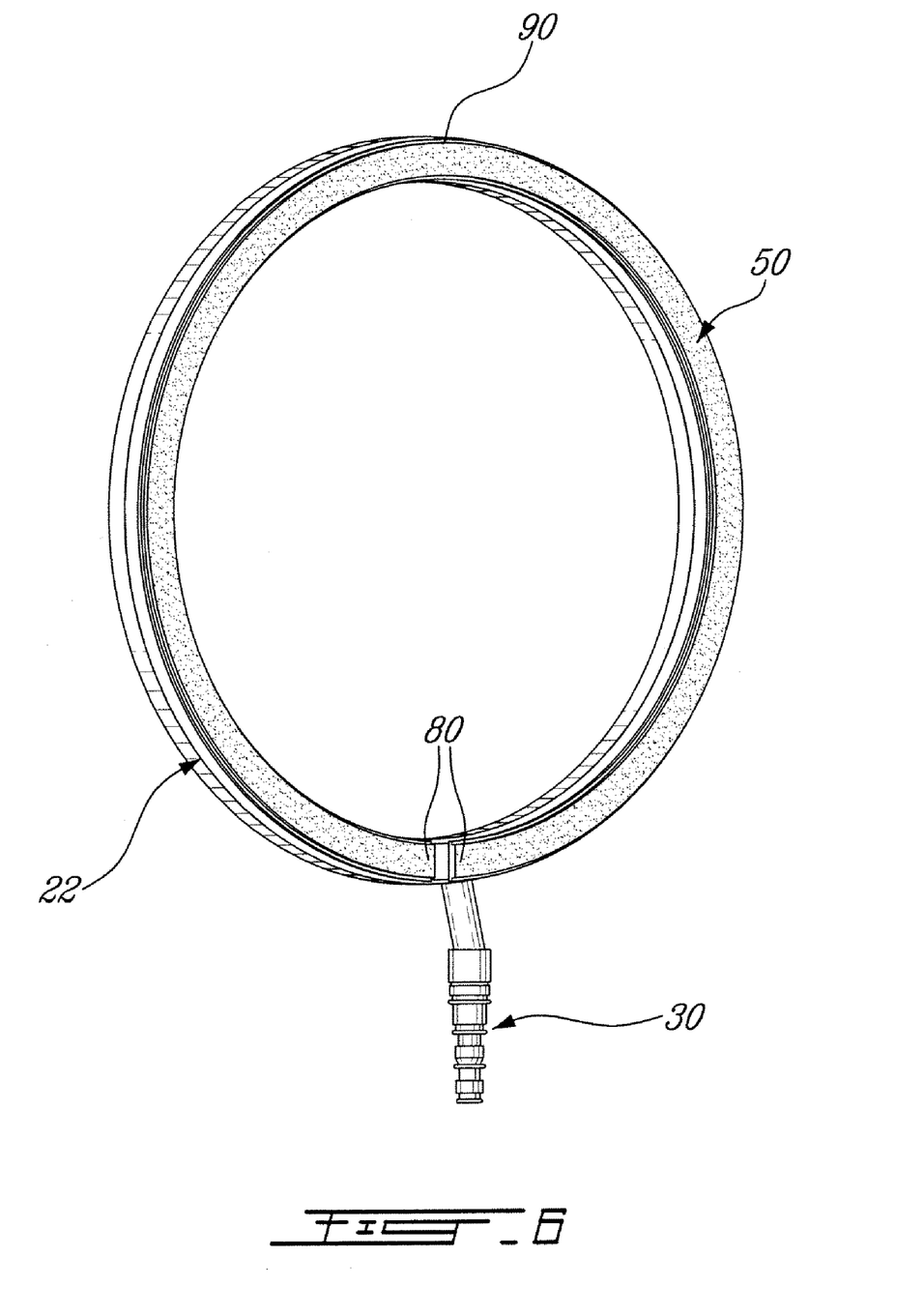
FIG. 6 is a view similar to FIG. 5 of another configuration of the invention.

In the embodiment shown, a rear sealing plate 42 is sealingly joined with the main body 51 of the heat pipe 50, and thereby encloses the channel 53 to seal a constant mass of working fluid therein. Other embodiments may be provided, however, in which the heat pipe may be otherwise formed in any suitable configuration to define a sealed cavity within which the working fluid is enclosed. Preferably the heat pipe is annular in shape, extends around the entire fuel manifold 22, and is integrally provided with the fuel manifold ring 22. The channel 53 preferably defines an endless, annular chamber, with the evaporator portion and the condenser portion of the heat pipe being conceptually defined at diametrically opposed regions of the annular heat pipe chamber (the evaporator function being generally provided in this embodiment by portion 72 of the fuel manifold 22, while the condenser function is generally provided by the cooler lower portion 70 of the fuel manifold 22). In other embodiments, however, that the heat pipe need not be continuously annular or endlessly circular, and may instead be semi-circular (FIG. 5) or almost completely circular (FIG. 6), or any other circular, curvilinear or linear shape desired, provided however that the heat pipe extends between a hot region of the fuel conveying member and a relatively cooler region of the engine or fuel conveying member, as will be appreciated by the skilled reader.

In the case of fuel manifold 22, due to its configuration, an excess of cooling power is available at the bottom portion 70, where fuel enters via inlet 30. Therefore, the lower portion of the heat pipe 50 acts as a condenser 80, wherein water vapour is cooled by the fuel in the corresponding lower portion of the fuel flow passage 40, and the upper portion 72 of the heat pipe 50 acts as an evaporator 90, wherein the liquid water is boiled for absorbing heat within the corresponding region of the fuel manifold 22, as will now be described further.

In use, the liquid water within the heat pipe of heat transfer device 50, which tends to collect in lower areas of the manifold because of gravity, is drawn by the wicking action in wick 57 up towards the hotter, drier upper portion 72 of the fuel manifold 22. The liquid water within the heat pipe can wickingly flow against gravity because of surface tension and capillary forces used by wicking materials, which draws the liquid water within the heat pipe 50 towards the evaporator portion. The wick 57 also helps ensure good coverage of inner surfaces of the channel 53 with liquid water in the evaporator portion of the heat pipe, which beneficially improves heat transfer to the liquid, and thus improves the rate of liquid boiling, as will be described further below. As the liquid is boiled, increased vapour pressure gradients then drive the flow of water vapour towards regions of lower vapour—i.e. towards the condensing zone of the heat pipe, where heat is extracted through cooling of the vapour and re-condensing into liquid. Fuel adjacent the condenser portion preferably removes heat from the heat pipe. Thus, as shown schematically in FIG. 4, in the evaporator portion, heat is transferred from the fuel within passage 40 (as represented by arrows 63) and from the heat pipe body 51 (as represented by arrows 61) to the rear body 38 of the fuel manifold, and from there to the heat transfer device 50. It will be understood that a generally reverse heat transfer occurs in the condenser portion.

As described above, the fuel manifold 22 tends to become hotter in certain regions due to reduced fuel flow therein. The heat transfer device 50 may be configured to provide adequate cooling, as necessary in this region. Also, the skilled reader will understand that after engine shut down, as the engine cools down, hot air tends to rise to the upper portions of the engine cavity, thus putting the fuel manifold 22 at risk of being overheated by the accumulated hot air—a risk further exacerbated by the fact that fuel is no longer cooingly flowing therethrough. Consequently, the heat transfer device 50 may be configured to provide adequate cooling, as necessary in regions susceptible to post-shutdown heating. In the embodiment described above, both of these overheating concerns coincide at the upper portion of the manifold 22, and thus the heat transfer device 50 may address both concerns simultaneously though a single cooling configuration. Other engine and manifold configurations may not have this simpler configuration, depending for example on where and how fuel is injected into the manifold, however the principles of the present invention may still be applied, either through the use of a single heat pipe concept, or through a multiple heat pipe configuration.

The reader will appreciate that the heat pipe of the present invention is passive, and thus continues to operate after shutdown until the driving heat differential between condenser and evaporator dissipates. Therefore, continued cooling of the inner wall surfaces 41 of the fuel flow passage 40, which tend to be still wet with fuel immediately following engine shut-down, and therefore the heat transfer device 50 can impede the initiation of coking by this so-called 'soak back' effect.

External insulation is preferably provided about at least part of the fuel conveying members, such that the effects of exposure to any high temperature surroundings is limited. An insulator apparatus is therefore preferably provided about at least the central body 31 of the fuel manifold ring 22. Particularly, heat shield 23 enclose an insulating air cavity 54 which surrounds the rear body walls 38 and the rear sealing plate 42 of the heat pipe 50.

As already discussed, by adjusting the pressure in the heat pipe to the appropriate levels (typically during manufacture), the liquid is evaporated at the desired temperature by the excess heat at the evaporator 90. This heat is rapidly delivered to the condenser 80 by the vapour, where is can be dispersed, preferably to the fuel flow in the condenser 80. Similarly, when the engine is shut down and heat begins to warm the upper portion 72 of the manifold 22, the working fluid in the evaporator portion 90 at the top of the heat pipe will boil heat entering the manifold in sufficiently high, and then the heat is removed by the vapour which flows down towards condenser at the bottom of the heat pipe, where the metal or other manifold material is cooler or is being cooled by cold airflow being drawn into the engine by hot air leaving through the exhaust.

Accordingly, the heat pipe 50 requires no pumps, and encloses a constant mass of working fluid within the sealed channel 53 which is self-circulating therein by two-phase flow cycle (liquid-vapour-liquid). The heat pipe 50 initiates cooling action automatically as soon as the temperature in the evaporator portion thereof, namely corresponding to an upper portion 72 of the fuel manifold, exceeds a predetermined limit. The heat pipe 50 therefore provides a relatively inexpensive, reliable and lightweight heat transfer device for the fuel manifold, which are major factors for consideration in any component to be used in an airborne gas turbine engine.

Although a single, annular, continuous heat pipe which is integrated with an internal manifold is described above, the principles of the invention are easily applied to other configurations. For example, heat pipe(s) may be provided in fuel flow passages in each fuel nozzle assembly 26, and may or may not extend throughout a common manifold, as desired. Multiple heat pipes of differing size, position, location, configuration, etc. may be provided, as desired and/or as required based on engine configuration. Multiple heat pipes may be provided in series, in parallel, or in unrelated relationships, and may be particularly useful where very high temperature gradients exist (ie industrial engine with regenerative exhaust cooling). Although heat pipes typically have one evaporator and one condenser, the present invention may employ, for example, a heat pipe having one central evaporator and two distal condensers, such as in a semi-circular configuration. In such design, the designer will understand that care may be required to provide a sufficiently stable system. The skilled reader will appreciate that the evaporator and condenser ends should preferably extend far enough into the relevant hot and cold environments to provide adequate heat and sink functions. This does not mean they must extend all around. As mentioned, the cold sink is not necessarily at the bottom nor the hottest wall necessarily at the top of the manifold.

The skilled reader will appreciate that the wick(s), if provided, need not extend along the full length of heat pipe, but rather only from just below a liquid low point to the evaporator. For airborne engine applications where attitude may change, however, and reliability may be critical, it may be preferable in such application to provide a wick system which extends substantially along/around the entirety of the heat pipe.

The above description is therefore meant to be exemplary only, and one skilled in the art will recognize that changes may be made to the embodiments described without department from the scope of the invention disclosed. For example, alternate configurations of fuel conveying members such as fuel manifolds and fuel nozzles can be used. Further, the heat pipe used as an heat transfer device for the fuel manifold can be separately formed rather than integrally formed within, and can comprise alternately constructions than that of the embodiment described. Any configuration, arrangement, design and number of fuel nozzle(s) and manifold(s) may be employed. When employed with an internal fuel manifold, the manifold may have any number of inlets, any suitable fuel conveying arrangement, and any layout suitable for use with the present invention. As well, although described with particular respect to airborne gas turbines, the invention may be applied to any suitable engine or other equipment in a suitable application. Still other modifications will be apparent to those skilled in the art, in light of a review of this disclosure, and such modifications are intended to fall within the appended claims.

The invention claimed is:

1. A gas turbine engine internal fuel manifold comprising at least one fuel flow passage and at least one heat pipe mounted to the fuel manifold, the heat pipe being adapted to transfer heat from a high temperature region of said fuel flow passage to a lower temperature region of the engine, said heat pipe comprising a constant mass of working fluid enclosed within a sealed chamber in heat transfer communication with fuel in said fuel flow passage, said working fluid being self-circulating in a fluid flow having a liquid portion and a vapour portion, the said working fluid passively boiling, flowing and condensing to transfer heat from said high temperature region to said lower temperature region.

2. The gas turbine engine internal fuel manifold as defined in claim 1, wherein said lower temperature region is a lower temperature region of the manifold.

3. The gas turbine engine internal fuel manifold as defined in claim 1, wherein said heat pipe is annular and has an evaporator portion and a condenser portion defined at diametrically opposed portions of the manifold.

4. The gas turbine engine internal fuel manifold as defined in claim 1, wherein the heat pipe includes a wicking member disposed along at least one inner surface of a working fluid chamber defined in the heat pipe, said wicking member being adapted to transport said working fluid in a liquid phase from a condenser portion to a evaporator portion of said heat pipe.

5. The gas turbine engine internal fuel manifold as defined in claim 1, wherein said heat pipe is disposed within said manifold.

6. A fuel conveying member in a gas turbine engine, the fuel conveying member comprising at least one fuel flow passage having a high temperature region and a lower temperature region thereof, and a heat pipe being disposed in heat transfer communication with said fuel flow passage and extending between said high and low temperature regions said heat pipe containing working fluid enclosed within a sealed chamber in heat transfer communication with fuel in said fuel flow passage, said working fluid being self-circulating in a fluid flow having a liquid portion and a vapour portion, said working fluid passively boiling, flowing and condensing to transfer heat from said high temperature region to said lower temperature region.

7. The fuel conveying member as defined in claim 6, wherein said heat pipe includes an internal wicking member extending from a portion of the heat pipe at which the working fluid pools to an evaporator portion of the heat pipe.

8. The fuel conveying member as defined in claim 6, wherein said fuel conveying member includes at least one of a fuel manifold and a fuel nozzle.

9. The fuel conveying member as defined in claim 6, wherein said heat pipe is annular.

\* \* \* \* \*